(12) United States Patent
Mack et al.

(10) Patent No.: US 8,794,631 B2
(45) Date of Patent: Aug. 5, 2014

(54) METHOD OF MANUFACTURING OF A COMPLIANT PLATE SEAL ASSEMBLY

(75) Inventors: Michael Dennis Mack, Ballston Spa, NY (US); William Edward Adis, Scotia, NY (US); Hrishikesh Vishvas Deo, Guilderland, NY (US); Daniel Frederick Purdy, Schenectady, NY (US); Norman Arnold Turnquist, Sloansville, NY (US)

(73) Assignee: General Electric Company, Schenectady, NY (US)

( * ) Notice: Subject to any disclaimer, the term of this patent is extended or adjusted under 35 U.S.C. 154(b) by 1381 days.

(21) Appl. No.: 12/351,886

(22) Filed: Jan. 12, 2009

(65) Prior Publication Data

US 2010/0176556 A1 Jul. 15, 2010

(51) Int. Cl.
*F16J 15/44* (2006.01)
*F16J 15/32* (2006.01)

(52) U.S. Cl.
CPC .................. *F16J 15/3292* (2013.01)
USPC ........................................................ 277/355

(58) Field of Classification Search
USPC ................................................ 277/355, 411
See application file for complete search history.

(56) References Cited

U.S. PATENT DOCUMENTS

| | | | |
|---|---|---|---|
| 4,989,919 A | | 2/1991 | Greer |
| 5,042,823 A | * | 8/1991 | Mackay et al. ............... 277/355 |
| 6,786,487 B2 | | 9/2004 | Dinc et al. |
| 6,840,519 B2 | | 1/2005 | Dinc et al. |
| 7,201,378 B2 | * | 4/2007 | Kono ............................. 277/355 |
| 7,334,328 B2 | * | 2/2008 | Uehara et al. ................. 29/888.3 |
| 7,419,164 B2 | * | 9/2008 | Awtar et al. ................... 277/418 |
| 2007/0102886 A1 | * | 5/2007 | Uehara et al. ................. 277/355 |
| 2007/0120326 A1 | * | 5/2007 | Rhodes et al. ................ 277/355 |
| 2008/0042365 A1 | * | 2/2008 | Awtar et al. ................... 277/411 |
| 2008/0042366 A1 | | 2/2008 | Awtar et al. |
| 2008/0099999 A1 | | 5/2008 | Williams |
| 2008/0169614 A1 | * | 7/2008 | Awtar et al. ................... 277/592 |
| 2008/0272553 A1 | | 11/2008 | Awtar et al. |
| 2010/0176556 A1 | | 7/2010 | Mack et al. |

FOREIGN PATENT DOCUMENTS

| | | |
|---|---|---|
| EP | 1878955 A1 | 1/2008 |
| EP | 1900983 A1 | 3/2008 |

OTHER PUBLICATIONS

Partial European Search Report issued Feb. 14, 2001 in connection with corresponding EP Application Mo. 10153023.6.

* cited by examiner

*Primary Examiner* — Gilbert Lee
(74) *Attorney, Agent, or Firm* — Cantor Colburn LLP

(57) ABSTRACT

A compliant plate seal manufacturing method is provided. The method includes assembling a plurality of compliant plates and a plurality of spacer shims into a weld fixture, thereby forming a leaf pack having a front and rear end and sides and a curvature, welding the sides of the leaf pack to hook plates on the weld fixture, removing a portion of the weld fixture, removing a portion of the hook plates and applying a radial flow plate to the leaf pack.

18 Claims, 12 Drawing Sheets

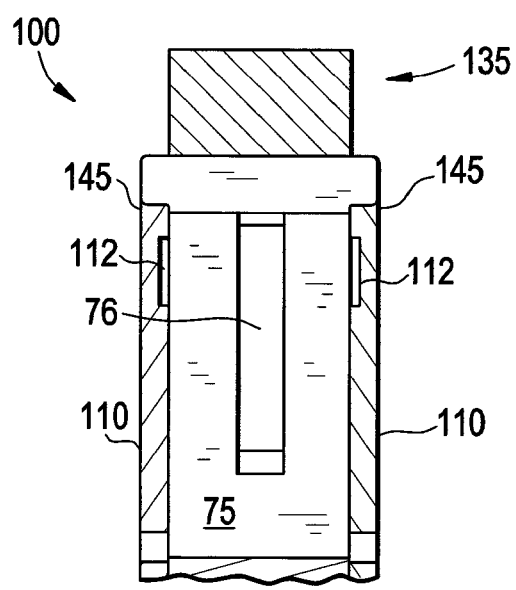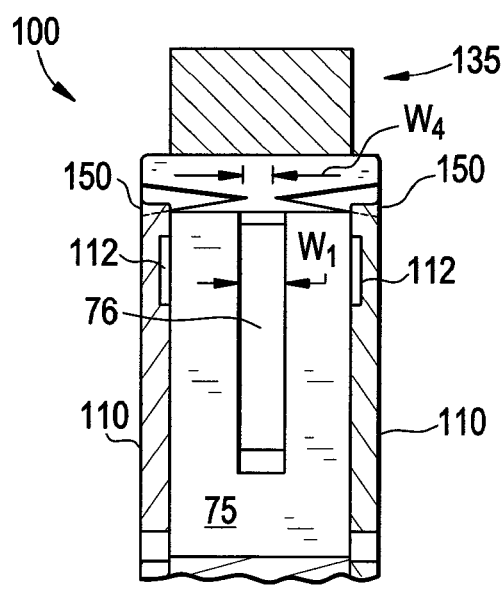

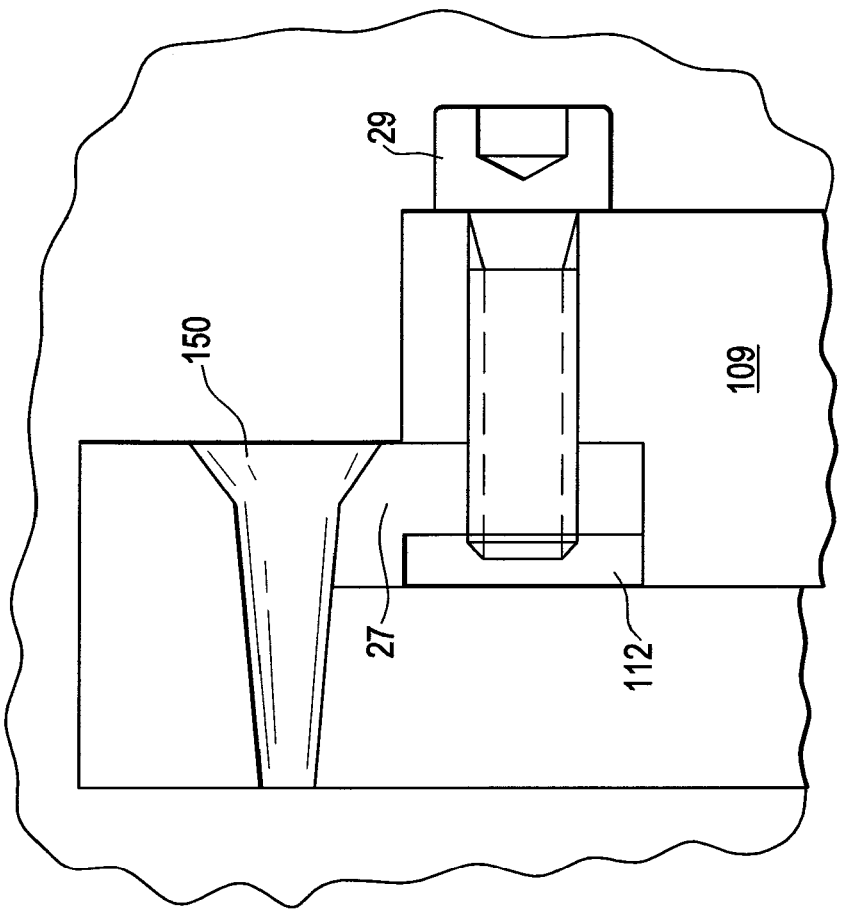
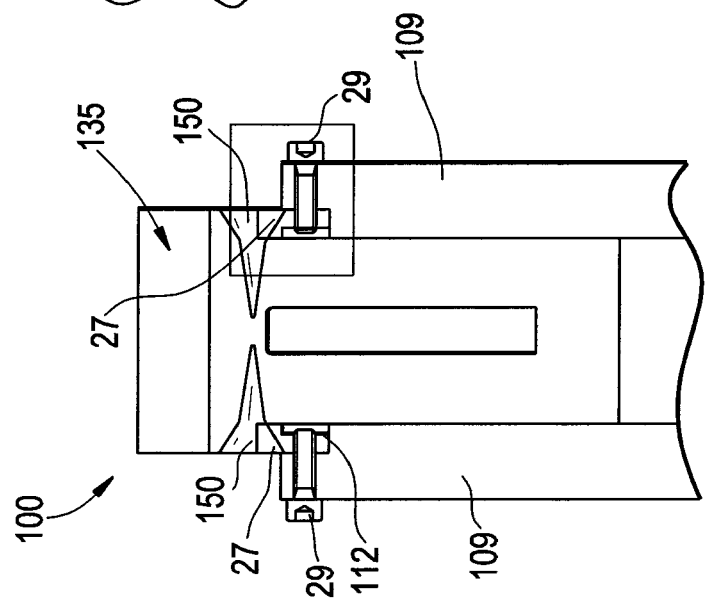
FIG. 9

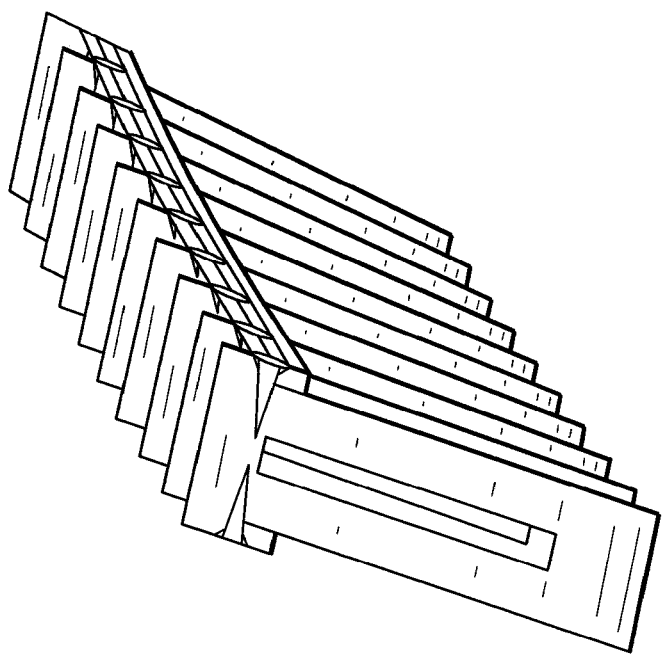
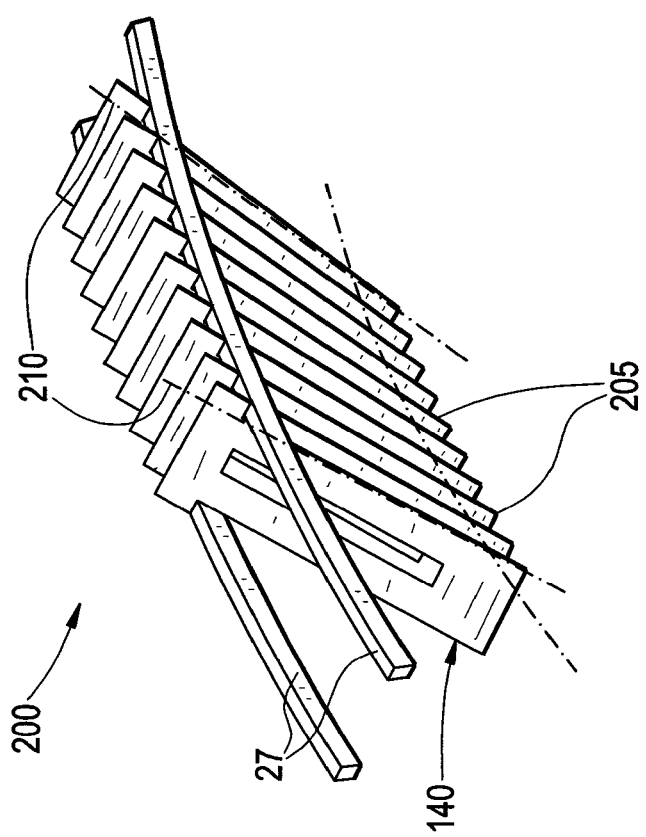
FIG. 11
FIG. 12

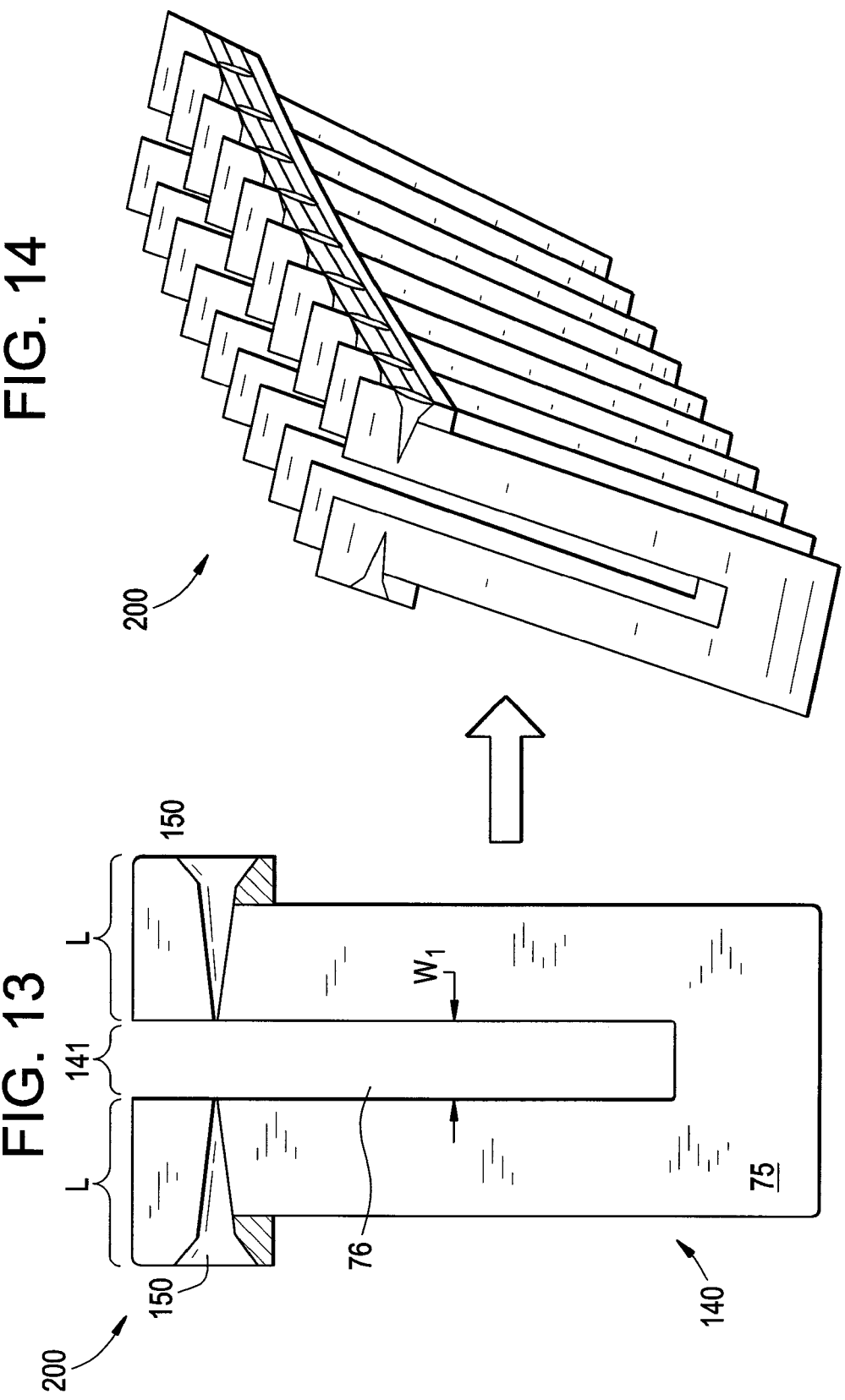

METHOD OF MANUFACTURING OF A COMPLIANT PLATE SEAL ASSEMBLY

BACKGROUND OF THE INVENTION

The subject matter disclosed herein relates to a sealing structure between a rotating component and a static component and, more particularly, to a compliant plate seal arrangement manufacturing method.

Dynamic sealing between a rotor (e.g., rotating shaft) and a stator (e.g., static shell or casing) is an important concern in turbomachinery. Several methods of sealing have been used. In particular, sealing based on flexible members has been used that include seal members such as compliant plate seals.

Known brush seals include tightly-packed, generally cylindrical bristles that are arranged in a staggered arrangement to reduce leakage. The bristles have a low radial stiffness that allows them to move in the event of a rotor excursion while maintaining a tight clearance during steady state operations. Brush seals, however, may be generally effective only below a limited pressure differential across the seal. Because of the generally cylindrical geometry of the bristles, the brush seals may have a low stiffness in the axial direction, which limits the maximum operable pressure differential in known brush seals to generally less than 400 psi.

Compliant plate seals have a plate-like geometry that has a significantly higher axial stiffness for a comparable radial stiffness and therefore such seals have the capability of being used with larger pressure differentials than known brush seals. Compliant plate seals, often packed together as a leaf pack, are welded to a housing that supports the compliant seals relative to a rotor (e.g., a rotating shaft). The compliant seals are welded to the housing at an outside diameter of the compliant seals. During the welding process, the compliant seals can shrink which causes distortion and wrinkling of the compliant plates, which can affect the dimensional accuracy and radial stiffness, on the compliant plates, which can lead to several problems including increased axial leakage and rotor heating.

BRIEF DESCRIPTION OF THE INVENTION

According to one aspect of the invention, a compliant plate seal manufacturing method is provided. The method includes assembling compliant plates and spacer shims into a weld fixture, thereby forming a leaf pack with the compliant plates inclined with respect to a radial of the weld fixture and having a curvature with respect to a base of the weld fixture. The method further includes welding the sides of the compliant plates and the spacer shims to hook plates disposed on the weld fixture.

According to another aspect of the invention, a seal assembly is provided. The seal assembly includes a first hook ring segment and a second hook ring segment parallel to the first hook ring segment, a leaf pack welded to the hook ring segments, wherein the leaf pack includes alternately arranged compliant plates and spacer shims and a radial flow plate coupled to the leaf pack. In addition, each of the compliant plates and the spacer shims of the leaf pack include an upper section that has been machined out to receive the radial flow plate. Furthermore, a weld between hook ring segments and each of the compliant plates extends from an outer portion of the leaf pack to a depth to secure the compliant plates and spacer shims to the hook ring segments.

According to yet another aspect of the invention, a weld fixture assembly is provided. The weld fixture includes a weld fixture body, including a base having a curvature a first hook plate affixed to the base and a second hook plate affixed to the base and parallel to the first hook plate. The weld fixture further includes alternately arranged compliant plates and spacer shims disposed between the hook plates forming a leaf pack and an angle block disposed on either end of the leaf pack establishing an angle of the leaf pack with respect to curvature of the base of the weld fixture. In addition, a weld region is defined between a hook ring segment of the hook plates and axial extended edges of each of the plurality of spacer shims and the plurality of compliant plates.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

FIG. 7 is a front cut away view of the weld fixture prior to being welded in accordance with exemplary embodiments.

FIG. 8 illustrates a front view of the weld fixture illustrating a weld along the weld region defined between hook plates and a leaf pack.

FIG. 9 illustrates a front view of an alternate embodiment of a weld fixture that implements a mechanical fastening of hook plates to a leaf pack.

FIG. 11 illustrates a perspective view of the leaf pack/hook ring segment combination of FIG. 10.

FIG. 12 illustrates a perspective view of the combination of FIGS. 10 and 11 with a portion of the hook ring segments machined out.

FIG. 13 illustrates a front view of the combination of FIGS. 11 and 12 in which an upper section of the leaf pack has been machined out.

FIG. 14 is a perspective view of the combination 200 of FIG. 13.

Figure 1:
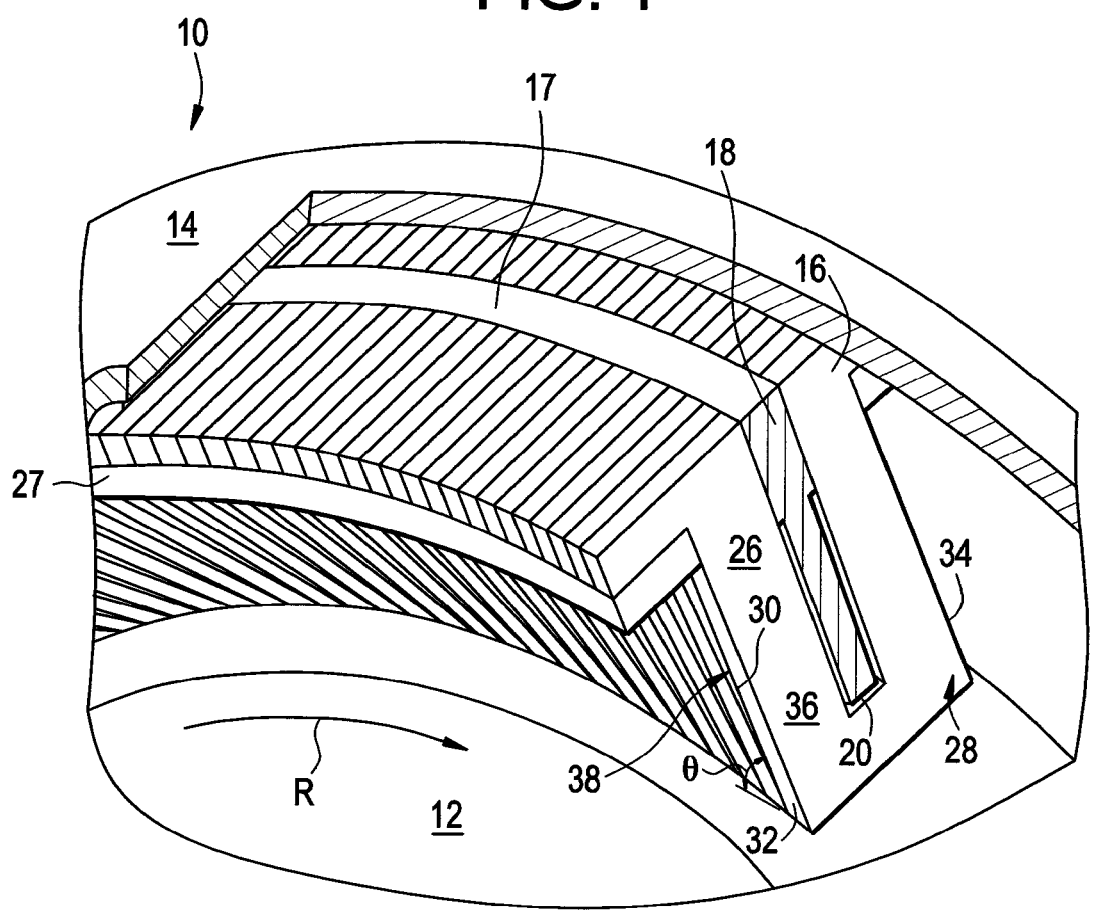
FIG. 1 is a perspective view of an exemplary compliant plate seal assembly as manufactured in accordance with exemplary embodiments.

The detailed description explains embodiments of the invention, together with advantages and features, by way of example with reference to the drawings.

DETAILED DESCRIPTION OF THE INVENTION

Exemplary embodiments include a manufacturing method to fabricate compliant plate seals with radial flow restrictors.

In exemplary embodiments, the method includes joining compliant plates interspaced with independent spacers to a ring or ring segment at a hook with an axial weld on both sides of the seal. The compliant plates and spacers are alternately assembled onto the hook rings mounted in the weld fixture. The angle of the compliant plate is established by the circumferential angle blocks at each end of the fixture. Angle blocks may be driven circumferentially to compress the seal pack when assembled. A radial surface at the seal tip constrains the rotational motion of the compliant plates about the contact point on the hook. Hook rings, onto which the spacer shims and the compliant plates and spacers are assembled, are of similar thickness as the width of the axial extended edges of the compliant plates and spacers. A cap plate is assembled at the outside diameter of the compliant plates and spacers to clamp them following assembling to eliminate gaps and prevent movement during welding. The compliant plates and the spacer shims are welded in the axial direction to the outside diameter of the hook rings on each side using a deep, narrow electron beam or laser weld. After removing the welded assembly from the weld fixturing, the lower region of the hook plates are machined to a defined diameter for precision fit to a mating housing. The tips of the compliant plates are machined to the final seal inner diameter relative to the inside diameter of the machined hook segments. The said seal inner diameter is approximately equal to the rotor diameter. The segment of compliant plates is then chord cut to the required chord length. Following the chord cut, the upper region above the center cutout in the compliant plate is removed to provide clearance for the machined arcuate housing with a radial flow restrictor plate. The machined seal is assembled into a housing with the radial flow restrictor plate. The inside diameter of the welded ring segment locates the seal and the features of the seal to the mating groove inside diameter in the housing. The end faces of the housing may be precut with predefined cant angles of the seal or they may be cut following assembly with the seal. The reason to perform the latter is that when forming a complete ring seal, machining tolerances between the housing manufacture and the seal segment manufacture may cause gaps between adjacent seal segments contributing to overall seal leakage.

In exemplary embodiments, the compliant plates are assembled in arcuate segments minimizing the number of post-processing steps required to finish or reshape the seal. The orientation of the compliant plates and spacers can be defined by the weld fixturing method. The fixturing packs the compliant plates and the shims very tightly at the contact diameter. The axial welds are applied on both sides of the compliant plates joining them to the outside diameter of a rigid ring segment, where the compliant plates and spacers are in close contact with minimal gaps This outside diameter of the ring segment is referred to as the hook diameter. To minimize distortion associated with weld shrinkage, the spacer extends a specific radial distance below the hook diameter into the tapered gap between adjacent compliant plates. This radial location is referred to as the contact diameter. Those skilled in the art will realize that hook diameter and the contact diameter have to apart by at least half of the weld pool width.

In exemplary embodiments, the electron beam or laser weld occurs at a radial location on the seal in which the compliant plates and shims are tightly packed, radially, at the weld joint to a pair of inner rings.

Figure 2:
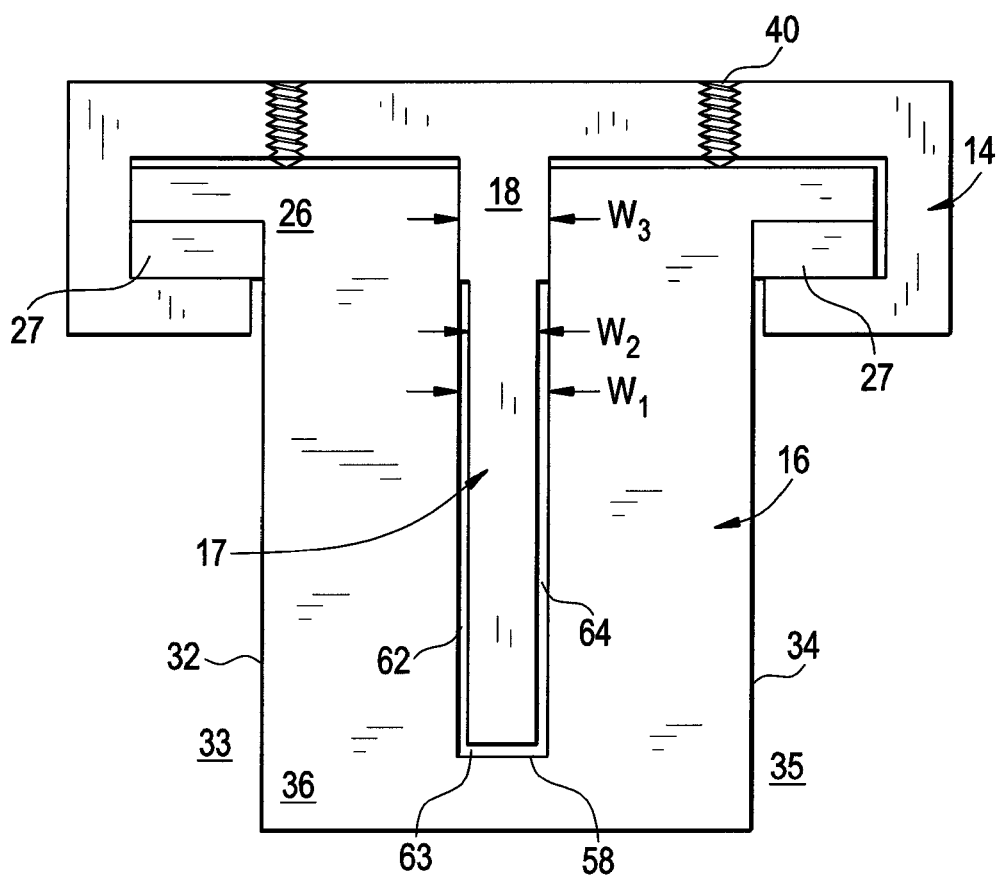
FIG. 2 is a cross-sectional view of seal assembly taken along line 2-2 in FIG. 1.
Figure 3:
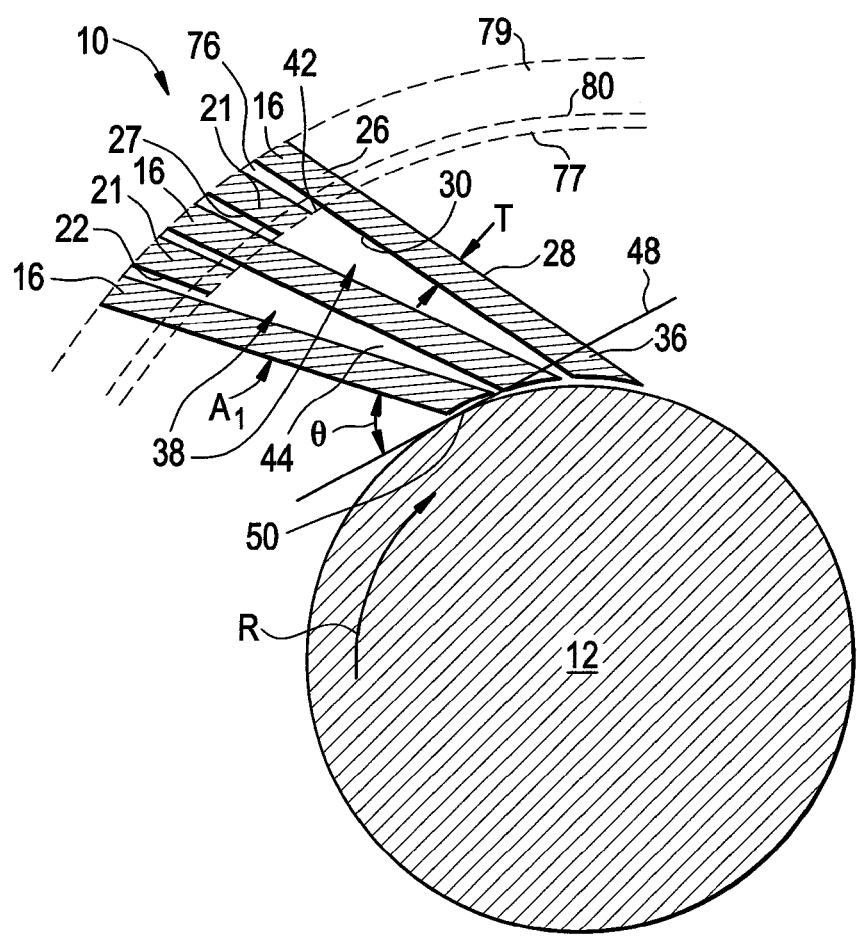
FIG. 3 is a cross-sectional view of seal assembly shown in FIG. 2.

FIG. 1 is a perspective view of an exemplary compliant plate seal assembly 10 as manufactured in accordance with exemplary embodiments described herein. FIG. 2 is a cross-sectional view of seal assembly 10 of FIG. 1. More specifically, in FIG. 2, seal assembly 10 is illustrated in a radially outward or retracted position, as described herein. FIG. 3 is a cross-sectional view of seal assembly 10 shown in FIG. 2 with the presence of a rotor 12. FIG. 3 further illustrates a detailed view of the arrangement of alternate spacer shim and compliant plate, with the gap between the two increasing from hook diameter to outside diameter.

In exemplary embodiments, the compliant plate seal assembly 10 facilitates reducing axial leakage between the rotor 12 and the stator. More specifically, the housing 14 is coupled to a turbine static shell or stator such that rotor 12 rotates relative to housing 14. In exemplary embodiments, the housing 14 may be coupled within the stator, in a rigid fashion, or as a part of a packing ring segment. Several arcuate segments may be arranged next to each other circumferentially, to form an annular seal between high-pressure region 33 and low-pressure region 35. For instance, six segments of 60-degree each may be employed to form the annular seal. In an alternate embodiment, the compliant plate seal and the housing 14 may be in the form of a 360-degree annular ring and the housing may be coupled to the stator. FIG. 2 illustrates set screws 40 as coupling the housing 14 to the compliant plate members 16. It is appreciated that any suitable housing configuration, coupling technique, and fastening technique can be implemented, which enables seal assembly 10 to function as described herein.

The shaft seal assembly 10 is provided with a plurality of compliant plate members 16 secured at their roots 26, in a facing relation (i.e., face-to-face), to housing 14. A plurality of spacer shims 21 are interleaved with the compliant plate members 16, such that the spacer shims 21 are alternately arranged with the compliant plate members 16. As used herein, the term "facing relation" refers an orientation in which a first side surface 28 of one compliant plate member 16 is adjacent to a second side surface 22 of an immediate adjacent spacer shim 21, and that a second side surface 30 of one compliant plate member 16 is adjacent to a first side surface of an immediate adjacent spacer shim 21. Each side surface 28, 30 of the compliant plate members 16 extends from a leading surface 32 at a high pressure side 33 to a trailing surface 34 at a low pressure side 35 of each compliant plate member 16, and from a root 26 to a tip 36 of each compliant plate member 16. It is appreciated that the leading surfaces 32 and/or trailing surfaces 34 of plate members 16 maybe exposed at high pressure side 33 and/or low pressure side 35, respectively. In exemplary embodiments, each compliant plate member 16 is substantially planar, or flat, along each side surface 28 and 30. The shaft seal assembly 10 further includes hook ring segments 27 that are affixed (e.g., via welding) adjacent the roots 26 of each of the compliant plate members 16 and the spacer shims 21.

In exemplary embodiments, when the compliant plate members 16 have substantially constant thickness T, a gap 38 is defined between adjacent compliant plate members 16 such that gap 38 is wider at an outer portion 42 than at an inner portion 44. As further described herein, the gap 38 is predefined accordingly by the presence of the spacer shims 21 alternately positioned between adjacent compliant plate members 16. Accordingly, the gap 38 tapers from outer portion 42 towards inner portion 44. As such, roots 26 of plate members 16 may be considered to be "loosely packed," and tips 36 may be considered to be "tightly packed." The term "tightly packed," as used herein, refers to an orientation in which adjacent plate tips 36 are not in contact with each other but are closely spaced.

In exemplary embodiments, the compliant plate members 16 are coupled to housing 14 such that each plate member 16 is oriented at an angle θ (also referred to herein as a "cant angle") relative to a respective tangent plane 48 of rotor 12. The tangent plane 48 is defined at a line 50 on rotor 12 that is proximate to plate tip 36. More specifically, at least one of the side surfaces 28 and/or 30 is oriented at angle θ relative to tangent plane 48. In exemplary embodiments, the cant angle θ is less than 90°. In one embodiment, cant angle θ is between approximately 30° and approximately 75°. It is appreciated that the assembly techniques described herein are also contemplated the manufacture of seals greater than the cant angle range described herein. In the exemplary embodiment, the cant angle θ is selected to ensure that plate members 16 are angled away from a direction R of rotation of rotor 12 such that the cant angle θ facilitates rotation of rotor 12 within seal assembly 10.

FIG. 3 further illustrates that the compliant plate members 16 and the spacer shims 21 are packed tightly at a contact diameter 77, and gaps 76 between the compliant plate members 16 and the spacer shims 21 increase from the contact diameter 77 to an outer diameter 79. As discussed above, those skilled in the art appreciate that a hook diameter 80 and the contact diameter 77 are apart by at least half of the weld pool width.

An axial flow resistance member 17 extends at least partially through compliant plate members 16 via a slot 20 and facilitates preventing axial leakage flow between the gaps 38. More specifically, in the exemplary embodiment, the axial flow resistance member 17 extends circumferentially about housing 14, and extends radially inward from housing 14 towards rotor 12.

In exemplary embodiments, the slot 20 and the axial flow resistance member 17 has a substantially constant width $W_1$, $W_2$, respectively. Furthermore, the axial flow resistance member 17 can include an upper portion 18 having width $W_3$, which can be substantially equal to the width $W_1$ of the slot 20. Alternatively, widths $W_1$, $W_2$, $W_3$, may be of any size that enables seal assembly 10 to function as described herein. Moreover, a gap 58 is defined between the axial flow resistance member 17 and the slot 20. In exemplary embodiments, the gap 58 includes a front section 62, a bridge section 63, and a back section 64. In FIG. 2, the slot 20 of compliant plate 16 and axial flow resistance member 17 of housing 14 are shown in the center of compliant plate member 16. In an alternative embodiment, the axial flow resistance member 17 may be offset in the axial direction from the center of housing 14.

In exemplary embodiments, dimensions of the gap 58 are selected based on predetermined hydrostatic lift and/or hydrostatic blowdown conditions. For example, the front section 62 may decrease while back section 64 of increases. Such a gap configuration may cause hydrostatic blowdown. As used herein, the term "blowdown" refers to a radially inward deflection of compliant plate members 16 under a pressure loading. In an alternative embodiment, the front section 62 may be larger than back section 64. Such a gap configuration may cause lift on plate members 16. In exemplary embodiments, the compliant plate members 16 experience an effective blowdown force near front section 62 and an effective lift force near back section 64, wherein front and back sections 62 and 64 are closer to each other as compared to known compliant plate seal assemblies. Because of the reduced distance between gap sections 62 and 64, the blowdown and lift forces are also closer to each other as compared to forces experience within known compliant plate seal assemblies. By reducing the distance between forces, twisting torque acting on each compliant plate member 16 is facilitated to be reduced, as compared to known compliant plate seal assemblies.

Figure 4:
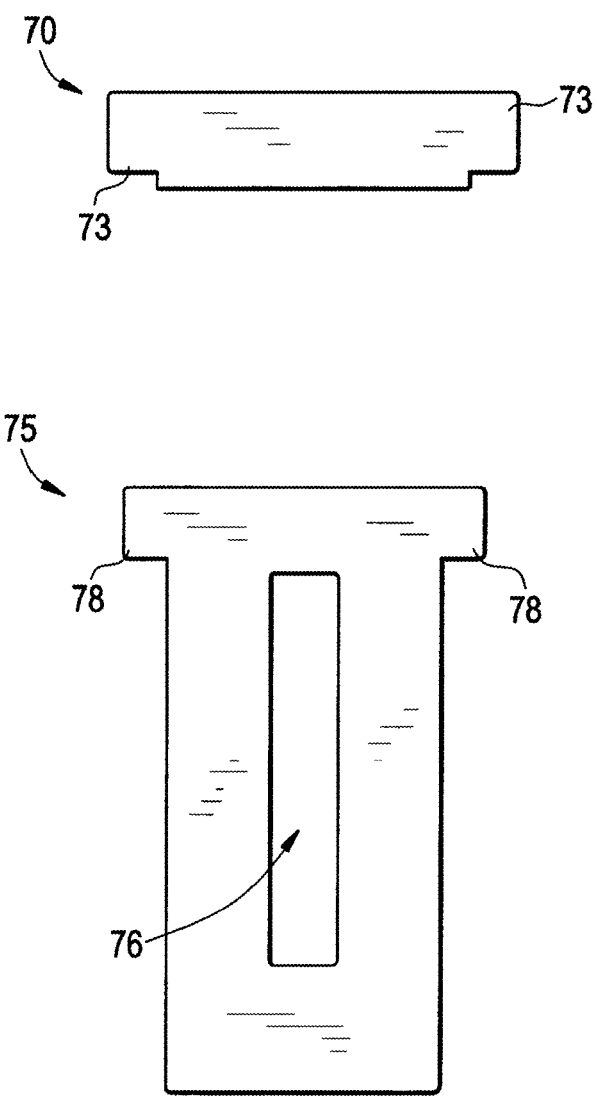
FIG. 4 is a spacer shim and compliant plate prior to manufacturing into the seal assembly in accordance with exemplary embodiments.

Exemplary methods for manufacturing the seal assembly 10 are now described. FIG. 4 illustrates a spacer shim 70 and compliant plate 75 prior to manufacturing into the seal assembly 10 in accordance with exemplary embodiments. During manufacturing of the seal assembly 10 alternating rows of spacer shims 70 and compliant plate 75 are tightly packed as a first step in forming the compliant plate members 16. In exemplary embodiments, the spacer shim 70 is implemented to provide the required spacing between each of the compliant plate 75 in the alternately packed arrangement. The spacer shims 70 include axial extended edges 73 that are configured to rest upon and be welded to the hook ring segment 27 as further described herein. As described above, the spacer shims 70 are interspaced between each compliant plate 75. The thickness of the spacer shim 70 provides the required spacing (i.e., the gap 38 in FIG. 3) between each of the compliant plates 75 at the root (26 in FIGS. 1-3). When assembled onto the hook ring segment 27 below each axial extended edge 73, the spacer shim 70 extends by a specific distance below the outside diameter of the hook ring segment 27, which is the line of contact between the spacer shims 70 and the compliant plates 75. The spacer shim 70 thickness is selected as some value generally within the range of 0.0005" to 0.010" to define the gap 38. This manufacturing technique does not limit the spacer thickness and can be implemented for thicknesses larger or smaller than the specified range described herein.

In exemplary embodiments, the compliant plates 75 are the shims or plates that include the flexible part of the seal assembly and are a portion of the compliant plate member 16. A center cutout 76 later defines the slot 20 that includes the radially oriented axial flow resistance member 17. The compliant plates 75 further include axial extended edges 78 that are configured to rest upon and be welded to the hook ring segment 27 as further described herein. The thickness of the compliant plate 75 is selected as some thickness value generally within the range 0.004" to 0.030" as labeled T above. This manufacturing technique does not limit the compliant plate thickness and can be implemented for thicknesses larger or smaller than the specified range described herein.

Figure 5:
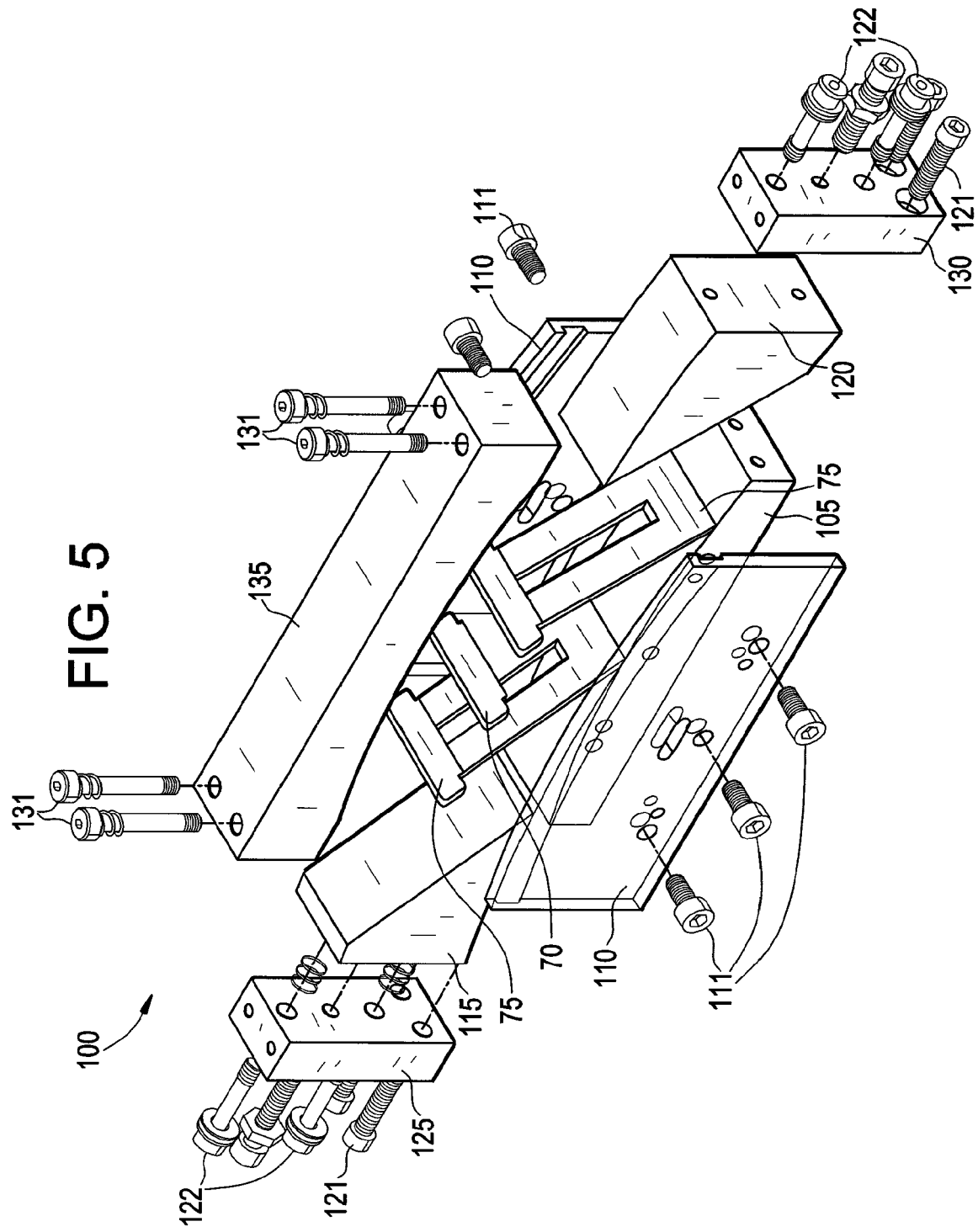
FIG. 5 illustrates an exploded perspective view of a weld fixture in accordance with exemplary embodiments.
Figure 6:
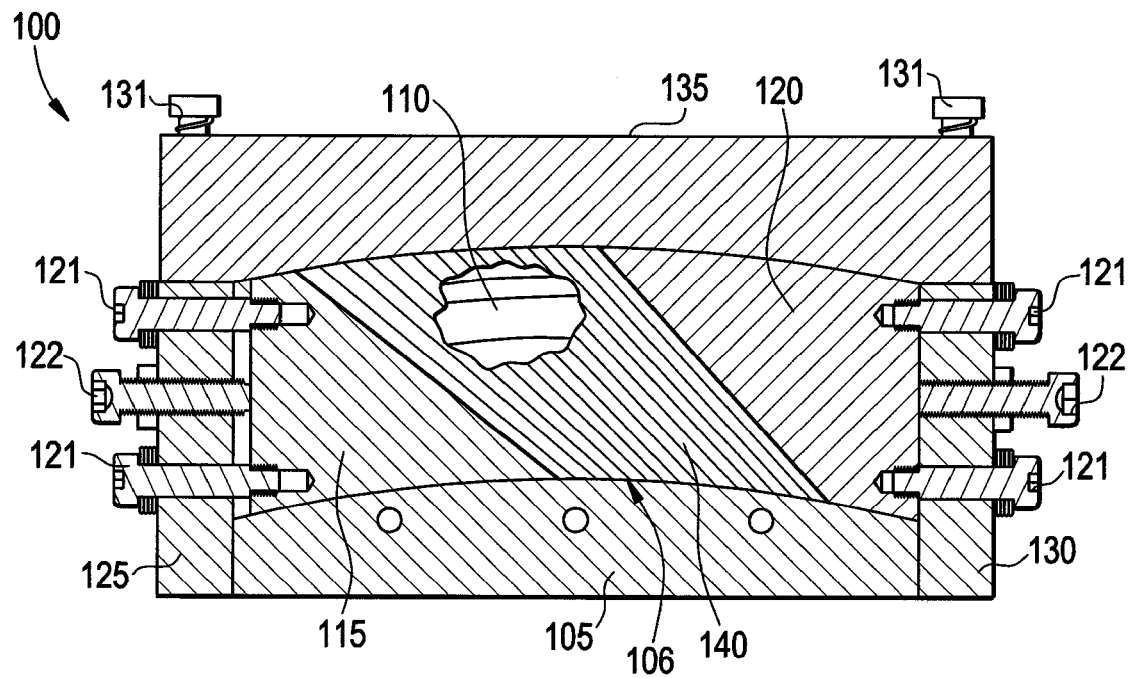
FIG. 6 illustrates a cross sectional side view of the weld fixture assembled in accordance with exemplary embodiments.

FIG. 5 illustrates an exploded perspective view of a weld fixture 100 in accordance with exemplary embodiments. FIG. 6 illustrates a cross sectional side view of the weld fixture 100 assembled in accordance with exemplary embodiments. The weld fixture 100 can include a base 105 that includes a curved surface 106. The base 105 is configured with the curved surface 106 to operate as a dummy rotor to constrain the compliant plates 75 from rotation as further described herein. The weld fixture 100 can further include hook plates 110 that are later machined into the hook ring segments 27 as further described herein. The hook plates 110 can be mechanically fastened to the base 105 via suitable fasteners 111. Angle blocks 115, 120 and respective end plates 125, 130 are further mechanically fastened to the base 105 via fasteners 121. In addition, load or jacking screws 122 are coupled to the angle blocks 115, 120, thus spring-loading the angle blocks 115, 120 to compress the spacer shims 70 and the compliant plates between the angle blocks 115, 120. In exemplary embodiments, the spacer shims 70 and compliant plates 75 are alternately assembled onto the hook plates 110 of the weld fixture 100. A reduced number of spacer shims 70 and compliant plates 75 are shown for illustrative purposes. It is appreciated that multiple spacer shims 70 and compliant plates 75 are present in a complete seal assembly (e.g., the seal assembly 10 of FIGS. 1-3). As described above, the axial extended edges 73, 78 of the respective spacer shims 70 and compliant plates 75 are packed onto the hook plates 110 as the spacer shims 70 and compliant plates 75 are alternately loaded into the weld fixture 100 between the angle blocks 115, 120. The resulting packed spacer shims 70 and compliant plates 75 are referred to as a leaf pack 140. The angle of the leaf pack 140 in the weld fixture 100 is established by the angle blocks 115, 120 at each end of the weld fixture 100. In exemplary embodiments, the spring loaded angle blocks 115, 120 may be driven to compress the leaf pack 140 when assembled through the jacking screws 122 mounted in each angle block 115, 120. The radial surface 106 at the tips of the spacer shims 70 and compliant plates 75 constrains the leaf pack 140 from rotating about the contact point on the hook plates 110. The hook plates 110, onto which the spacer shims 70 and the compliant plates 75 are assembled, are of similar thickness as the width of the axial extended edges 73, 78 of the spacer shims 70 and the compliant plates 75. A cap plate 135 is assembled to the outside diameter of the leaf pack 140 to clamp them following assembling and prevent movement during welding. The cap plate 135 can be mechanically fastened to the weld fixture (into the end plates 125, 130 as illustrated) via mechanical fasteners 131.

FIG. 7 is a front cut away view of the weld fixture 100 prior to being welded in accordance with exemplary embodiments. When fully assembled, the compressed leaf pack 140 is secured within the weld fixture 100. As described above, the axial extended edges 73, 78 of the spacer shims 70 and the compliant plates 75 rest upon the hook plates 110, thereby forming a weld region 145 (i.e., radial hook surfaces of the hook plates 110 used to locate the spacer shims 70 and compliant plates 75 at the proper angle and serves as the weld joint for the seal assembly 10). As such, it is appreciated that the hook plates 110 provide the axial positioning of the spacer shims 70 and the compliant plates 75 in addition to the weld region 145. The hook plates 110 include a relief location 112 provided in the face of the hook plates 110 adjacent to the leaf pack 140. As further described herein, after the leaf pack 140 is welded to the leaf pack 140, the hook plates 110 are machined at the relief locations 112.

In exemplary embodiments, a weld beam (e.g., an electron beam or laser beam) is focused along the weld region 145 in order to weld the leaf pack 140 to the hook plates 110. The weld beam can be an electron beam or a laser beam, which provides a thin and narrow beam to minimize heating of the hook plates 110 as well as a deep weld along the hook plates 110 and the leaf pack 140. FIG. 8 illustrates a front view of the weld fixture 100 illustrating welds 150 along the weld regions 145 defined between the hook plates 110 and the leaf pack 140. In the exemplary embodiment, the welds 150 penetrate to a depth past the cut out region 76 of the compliant plates 75. In an alternative embodiment, the welds between the hook ring segments 27 and the leaf pack extends from an outer portion of the leaf pack 140 to a sufficient depth to secure the compliant plates and spacer shims to the hook ring segments 27.

In exemplary embodiments, the leaf pack 140 is welded in the axial direction to the hook plates 110 on each side using optimized weld parameters to minimize the weld width while maximizing penetration depth. The purpose of minimizing the weld width is to reduce distortions or weld shrinkage inherent in the welding process. Maximizing the weld penetration depth ensures the welded seal assembly 10 withstands the stresses incurred in a turbine environment. The leaf pack 140 is first welded on one side with a shallow weld in the axial direction to secure the leaf pack 140 to the hook plate 110. This weld minimizes the potential for radial gaps during a deep weld penetration on the opposite side. The weld fixture 100 is flipped over and welded in the axial direction on the opposite side with a deep weld penetration. The weld fixture 100 is then flipped again and re-welded at the same location and orientation as the shallow weld but with the weld parameters set to obtain the desired weld width and weld depth. It is appreciated that in the exemplary embodiment, the depth of the weld 150 is such that a width $W_4$ of the remaining non-welded portions of the hook plates 110 and the leaf pack 140 is less than the width $W_1$ of the cut out 76. In an alternative embodiment, the welds between the hook ring segments and the leaf pack 140 extend from an outer portion of the leaf pack 140 to a sufficient depth to secure the compliant plates 75 and spacer shims 70 to the hook ring segments 27. After the leaf pack 140 is welded to the hook plates 110, the other components of the weld fixture 100 are removed. In exemplary embodiments, the fasteners 131 and cap plate 135 are removed. The fasteners 121, end plates 125, 130 and respective angle blocks 115, 120 are also removed. Finally, the base 105 is removed. As described further herein, the welded combination of the leaf pack 140 and the hook plates 110 remains. The hook plates 110 are then machined as further described herein.

FIG. 9 illustrates a front view of an alternate embodiment of a weld fixture 101 that implements a mechanical fastening of the hook plates to the leaf pack 140. The hook ring segments 27 that are to be welded to the leaf pack 140 may be assembled and bolted to a lower support plate 109 via a mechanical fastener 29. A basic bolted assembly is shown in FIG. 9 as an example as there are numerous ways to bolt the hook ring segments 27 to the support plates 109. The spacer shims 70 and compliant plates 75 are assembled and oriented in the same manner as previously described. The welding and removal of the weld fixture 100 is also performed as previously described.

Figure 10:
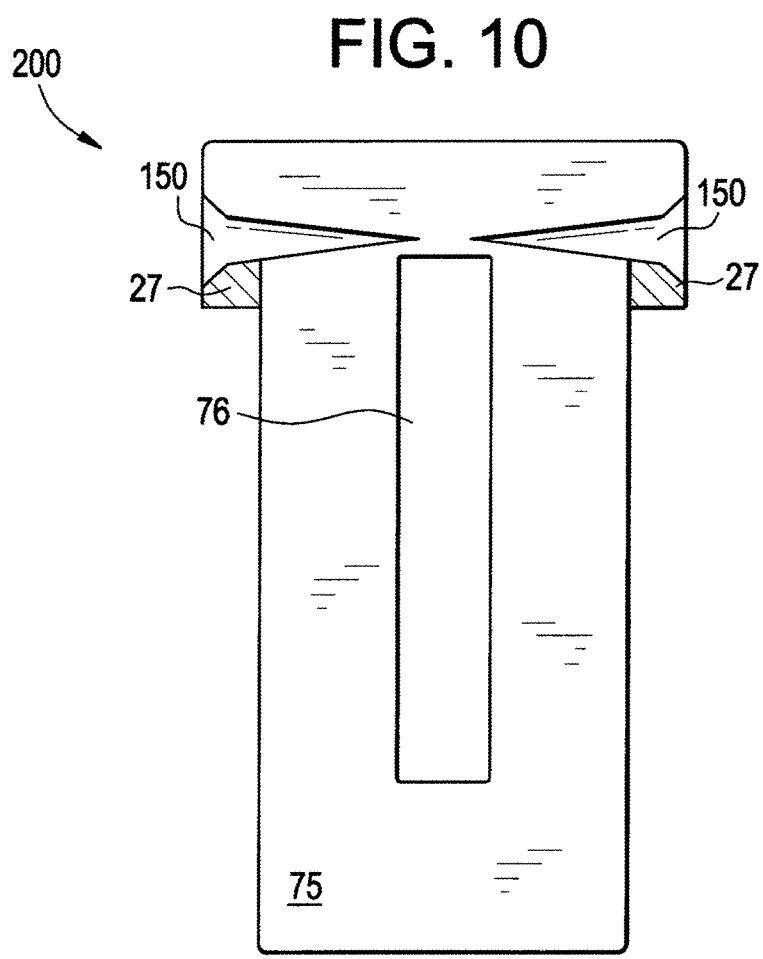
FIG. 10 illustrates a front view of a leaf pack welded to hook ring segments as a leaf pack/hook ring segment combination.

Referring again to FIG. 8, as described above, lower portions of the hook plates 110 are machined at the relief locations 112 after welding. Alternatively, as illustrated in FIG. 9, the lower support plates 109 can be removed after welding. FIG. 10 illustrates a front view of the leaf pack 140 welded to the hook ring segments 27 as a leaf pack/hook ring segment combination 200. As described above, the lower portions of the hook plates 110 have been machined off such that the hook ring segments 27 remain for affixing to the housing 14 as described herein. In addition, as known in the art, the welding process may leave rough edges along the weld 150. As such, the weld 150 can also be machined to a smooth surface for affixing to the housing 14 as described herein. It is appreciated that any current machining techniques can be implemented to remove the lower portions of the hook plates 110 including but not limited to grinding, sink electrical discharge machining (EDM), and milling.

FIG. 11 illustrates a perspective view of the leaf pack/hook ring segment combination 200 of FIG. 10. In exemplary embodiments, in order to affix the combination in the housing 14, the curvature 205 of each individual compliant plate 75 in the leaf pack 140 are machined approximately to a diameter and curvature of the rotor 12 of the final seal assembly 10. The machine cut of the leaf pack 140 is indicated by the curvature 205. In addition, a chord cut is performed generally along lines 210 corresponding to an angle of the leaf pack 140. FIG. 12 illustrates a perspective view of the combination 200 of FIGS. 10 and 11 after the aforementioned machine cuts.

FIG. 13 illustrates a front view of the combination 200 of FIGS. 11 and 12 in which an upper section 141 of the leaf pack 140 (both the spacer shims 70 and compliant plates 75) has been machined out. FIG. 14 is a perspective view of the combination 200 of FIG. 13. It is appreciated that the resulting gap, including both the cutout portion 76 and the upper section 141, corresponds to the slot 20 of seal assembly 10 into which the axial flow resistance member 17 extends. In addition, the slot is of width $W_1$. It is further appreciated that in the exemplary embodiment, the weld 150 covers the entire length L of the remaining portions of the spacer shims 70 and the compliant plates 75 including the hook ring segments 27, therefore providing a complete weld between the spacer shims 70, compliant plates 75 and the hook ring segments 27. In an alternative embodiment, the welds between the hook ring segments 27 and the leaf pack 140 extend from an outer portion of the leaf pack 140 to a sufficient depth to secure the compliant plates 75 and spacer shims 70 to the hook ring segments 27.

Figure 15:
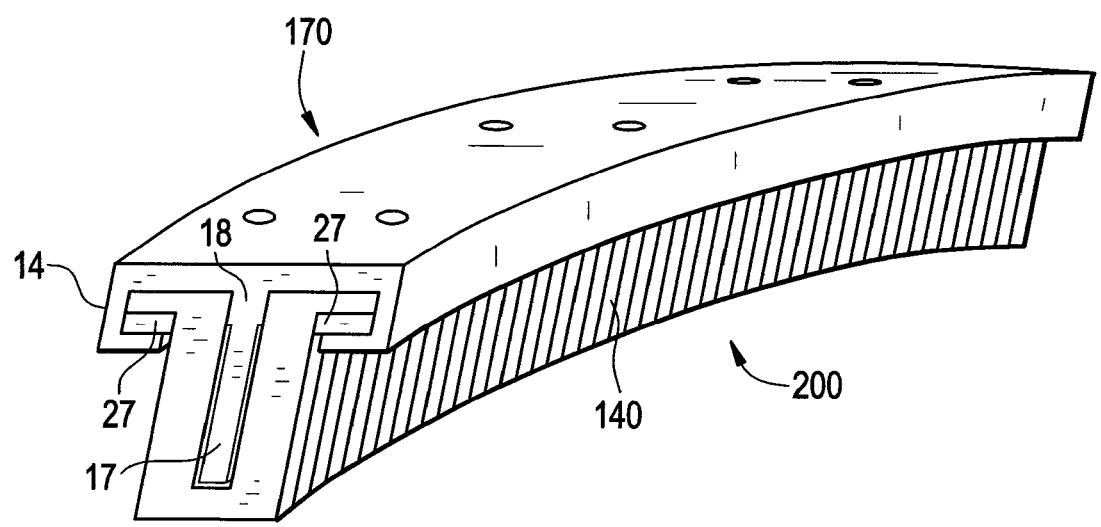
FIG. 15 illustrates an exemplary mechanically affixed arcuate radial flow plate housing.

Referring again to FIG. 2, an embodiment of a housing 14 including an integral axial flow resistance member 17 is illustrated. The housing 14 and the axial flow resistance member 17 are now referred to as an arcuate radial flow plate housing 170 as shown in FIG. 15. In exemplary embodiments, the arcuate radial flow plate housing 170 is affixed to the arcuate segment via mechanical fasteners or welding as described above. The finished combination 200 is assembled into the housing for the final seal assembly 10. FIG. 15 illustrates an arcuate radial flow plate housing 170 in accordance with exemplary embodiments. The inside diameter of the welded hook ring segment 27 locates the seal of the arcuate radial flow plate housing 170 and the features of the seal mate with an inside diameter groove of the housing 14. FIG. 15 illustrates an exemplary mechanically affixed arcuate radial flow plate housing 170. For the mechanically affixed arcuate radial flow plate housing 170, the combination 200 is machined as described above. The end cuts are made co-planar to the compliant plates 70 as described. The housing 14 is then mechanically assembled to the combination resulting in the arcuate radial flow plate housing 170. In exemplary embodiments, the end faces of the housing 14 may be precut with predefined cant angles of the final seal assembly 10 or the end faces may be cut with the corresponding leaf cant angles following final assembly with the combination 200. In exemplary embodiments, performing the cut of the end following assembly prevents gaps between adjacent seal segments contributing to overall seal leakage, when forming a complete ring seal, the gaps being caused by machining tolerances between the housing manufacture and the seal segment manufacture.

The exemplary manufacturing methods described herein provide assembly of the individual compliant plates 75 into arcuate segments minimizing the number of post-processing steps required to finish or reshape the seal. The orientation of the spacer shims 70 and the compliant plates 75 is defined by the weld fixturing. The exemplary embodiments described herein pack the spacer shims 70 and the compliant plates 75 tightly at the weld joint with the hook ring segments 27. The axial welds are applied on both sides of the compliant plates joining them to the OD of a rigid ring segment and occur at a radial position of the seal where the spacer shims 70 and the compliant plates 75 are in close contact thereby providing minimal gaps. To minimize distortion associated with weld shrinkage, the spacer shims 70 extend a specific radial distance below the weld region 145 into the tapered gap between adjacent compliant plates 75.

In the preferred embodiment described herein, the seal uses significantly straight compliant plates with significantly uniform thicknesses. Those skilled in the art appreciate that the proposed manufacturing technique works for other compliant plate seal arrangements in which the leaves may be without cutout, curved, bent at one or more places, or have varying thicknesses at one or more sections.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A compliant plate seal manufacturing method, comprising:
    assembling a plurality of compliant plates and a plurality of spacer shims into a weld fixture that includes a radial flow plate housing and an axial flow resistance member, thereby forming a leaf pack with the plurality of compliant plates inclined with respect to the weld fixture and having a curvature with respect to a base of the weld fixture;
    forming a cut out in the leaf pack that provides for the axial flow resistance member;
    removing an upper section of each of the plurality of spacer shims and plurality of compliant plates; and
    welding the sides of the plurality of compliant plates and the plurality of spacer shims to hook plates disposed on the weld fixture;
    wherein the axial flow resistance member extends from the .radial flow plate housing to at least the cut out in the leaf pack.

2. The method as claimed in claim 1 wherein the sides of the leaf pack are welded to hook ring segment portion of the hook plates.

3. The method as claimed in claim 2 further comprising:
    removing the hook plates and the leaf pack from the weld fixture; and
    removing a portion of the hook plates to align with the radial surface of a housing.

4. The method as claimed in claim 1 wherein sides of the leaf pack are welded to a 360° hook ring to form a 360° seal.

5. The method as claimed in claim 1 wherein the plurality of compliant plates and the plurality of spacer shims are alternately packed into the weld fixture, wherein axial extended edges disposed on each side of the respective spacer shims and compliant plates are in mechanical contact with a hook ring segment of the hook plates.

6. The method as claimed in claim 1 further comprising forming the radial flow plate cut out by removing material from the leaf pack.

7. The method as claimed in claim 1 wherein each of the plurality of compliant plates includes the cut out.

8. The method as claimed in claim 7 further comprising removing an upper section of each of the spacer shims and compliant plates of the leaf pack.

9. The method as claimed in claim 8 wherein removing the upper section of each of the spacer shims and compliant plates of the leaf pack is through sink electrical discharge machining EDM.

10. The method as claimed in claim 8 wherein the cut outs of the compliant plates are aligned with the removed upper sections of the compliant plates.

11. The method as claimed in claim 10 further comprising increasing, through sink EDM, the axial width of the compliant plate cutout for the radial flow restrictor.

12. The method as claimed in claim 8 wherein the cut outs of the compliant plates are smaller than the removed upper sections of the compliant plates.

13. The method as claimed in claim 8 wherein the radial flow plate is affixed adjacent the removed upper sections and cut outs of the compliant plates.

14. The method as claimed in claim 1 wherein the leaf pack is welded along a weld region defined by between axial extended edges on each of the spacer shims and the compliant plates and a ring hook portion of the hook plates.

15. The method as claimed in claim 14 wherein the welding is performed with at least one of an electron beam and a laser.

16. The method as claimed in claim 14 wherein the weld is performed to a depth adjacent to or beyond a cut out on each of the compliant plates.

17. The method as claimed in claim 14 wherein the weld is performed to a sufficient depth to secure the compliant plates and spacer shims to the hook ring segments.

18. A seal assembly, comprising:
- a first hook ring segment and a second hook ring segment parallel to the first hook ring segment;
- a leaf pack welded to the hook ring segments, wherein the leaf pack includes alternately arranged compliant plates and spacer shims; and
- a radial flow plate coupled to the leaf pack,
- wherein each of the compliant plates and the spacer shims of the leaf pack include an upper section that has been removed to receive the radial flow plate,
- wherein a weld between hook ring segments and each of the compliant plates extends from an outer portion of the leaf pack to a depth to secure the compliant plates and spacer shims to the hook ring segments.

* * * * *